United States Patent
Hirao et al.

(10) Patent No.: US 6,921,624 B2
(45) Date of Patent: Jul. 26, 2005

(54) OPTICAL RECORDING MEDIUM

(75) Inventors: Akiko Hirao, Chiba (JP); Kazuki Matsumoto, Kanagawa (JP); Takayuki Tsukamoto, Kanagawa (JP); Hideyuki Nishizawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 354 days.

(21) Appl. No.: 10/237,014

(22) Filed: Sep. 9, 2002

(65) Prior Publication Data

US 2003/0104285 A1 Jun. 5, 2003

(30) Foreign Application Priority Data

Sep. 26, 2001 (JP) ........................................ 2001-294012

(51) Int. Cl.$^7$ ................................................ G11B 7/24
(52) U.S. Cl. ............................ 430/270.14; 430/270.15; 549/434; 385/122; 369/284; 369/288
(58) Field of Search ............................ 369/288, 275.2, 369/284; 549/437, 439, 440, 449, 450, 453, 454, 474, 475, 479, 200, 228, 229, 331, 430, 432, 434, 436; 430/270.1, 270.11, 270.14, 270.15, 270.17, 270.2; 428/1.1; 252/299.01; 359/3, 6; 385/122; 478/64.8

(56) References Cited

U.S. PATENT DOCUMENTS

| | | | |
|---|---|---|---|
| 4,822,716 A | | 4/1989 | Onishi et al. |
| 5,017,453 A | | 5/1991 | Onishi et al. |
| 5,064,264 A | * | 11/1991 | Ducharme et al. .......... 385/130 |
| 5,097,016 A | * | 3/1992 | Ishii et al. .................. 530/350 |
| 5,361,148 A | * | 11/1994 | Bjorklund et al. ............. 359/4 |
| 5,460,907 A | | 10/1995 | Ducharme et al. |
| 5,744,267 A | * | 4/1998 | Meerholz et al. .............. 430/1 |
| 5,800,950 A | | 9/1998 | Hirao et al. |
| 6,267,913 B1 | * | 7/2001 | Marder et al. .............. 252/582 |
| 2002/0016472 A1 | * | 2/2002 | Tsien et al. ................. 548/159 |

FOREIGN PATENT DOCUMENTS

| | | | | |
|---|---|---|---|---|
| JP | 05-058980 | * | 3/1993 | ......... C07C/255/42 |
| JP | 05-140065 | * | 6/1993 | ......... C07C/245/08 |
| JP | 06-016611 | * | 1/1994 | ......... C07C/255/45 |

OTHER PUBLICATIONS

English translation of Hidaka 05–058980.*
English translation of Kinoshi 05–140065.*
English translation of Hidaka 06–016611.*
U.S. Appl. No. 09/450,743, filed Nov. 30, 1999, Hirao et al.
U.S. Appl. No. 10/123,168, filed Apr. 17, 2002, pending.
U.S. Appl. No. 09/805,128, filed Mar. 14, 2001, pending.
U.S. Appl. No. 09/956,972, filed Sep. 21, 2001, pending.
U.S. Appl. No. 09/492,117, filed Jan. 27, 2000, pending.

* cited by examiner

Primary Examiner—Martin Angebranndt
Assistant Examiner—Jennifer R. Sadula
(74) Attorney, Agent, or Firm—Oblon, Spivak, McClelland, Maier & Neustadt, P.C.

(57) ABSTRACT

Disclosed is an optical recording medium comprising a recording layer. The recording layer contains: a charge generation material generating an electron and a hole by light irradiation; a charge transport material transporting one of the electron and the hole; a charge trap which traps the transported one of the electron and the hole to separate the electron and the hole; and a non-linear optical material which changes optical properties of the recording layer in accordance with electric field formed by the electron and the hole being separated from each other. The non-linear optical material has an asymmetrical carbon atom and a cyclic group. Or, it is a cyclic-group-containing constituent having: an inversion symmetric pi-electron system; at least one of an electron donating group and an electron accepting group which are bonded to the inversion symmetric π-electron system; and an asymmetrical carbon atom.

20 Claims, 2 Drawing Sheets

OPTICAL RECORDING MEDIUM

CROSS-REFERENCE TO RELATED APPLICATIONS

This application is based upon and claims the benefit of priority under 35 U.S.C. §119 to Japanese Patent Application No. 2001-294012, filed on Sep. 26, 2001, the entire contents of which are incorporated by reference herein.

BACKGROUND OF THE INVENTION

1. Field of the Invention

The present invention relates to a photorefractive optical recording medium, in particular to an optical recording medium whose optical characteristics is suppressed from deteriorating.

2. Description of the Related Art

A photorefractive medium is known as one of optical recording media that can record the information with a far higher density than the conventional media according to magneto-optical recording or photo-thermal phase-change recording, such as optical disc. The photorefractive medium can record large capacity data such as high-density images by changing the refractive index in the recording layer of the medium. A mechanism is as follows. When electric charges are generated inside of the medium by irradiating the light, these electric charges are spatially separated. Then the spatially separated electric charges generate the electric field. The electric field changes the refractive index of the recording material in the recording medium. Information is recorded in accordance with the change in the refractive index. When the electric field that is formed in the medium is large, large change in the refractive index will be observed, resulting from Pockels effect. The photorefractive medium can directly record an optical interference pattern as a refractive index pattern. The application for the photoreflactive medium is a holographic data storage and optical processing element, etc.

As materials for the photorefractive medium, inorganic ferroelectric crystals are widely known. Furthermore, recently, photorefractive polymers have been developed. The photorefractive polymers have dielectric constants far smaller than those of the inorganic crystals and are expected to have larger performance indexes and speedier responses, and can be easily produced (for example, Japanese Patent Application Laid-Open Nos. 6-55901 and 6-175167). The photorefractive polymer is a complex material made of molecules that show each function of charge generation, charge transportation, charge trapping and electro-optical effect, and the characteristics thereof can be tuned by changing a combination of the constituent molecules according to the use conditions.

In the conventional photorefractive recording medium, ordinarily, a polling process for orienting molecules is applied to the medium, in order to enhance a refractive index modulation of the medium by a generated internal electric field. The polling process comprises orienting the non-linear optical material molecules that cause refractive index modulation of the medium, enables to enhance the refractive index modulation at the time of the formation of a spatial electric field due to optical recording. Accordingly, the sensitivity of the medium can be enhanced, owing to the polling process.

However, the molecular orientation generated due to the polling process may be relaxed owing to heat or the like, resulting in a smaller refractive index modulation and smaller diffraction efficiency. Moreover, when the recording is carried out without applying an electric field, since the irradiated light and temperature at the recording may move the oriented molecules and a degree of orientation becomes smaller, the diffraction efficiency becomes smaller and multiplicity becomes lower. Additionally, in the medium easy to cause molecular orientation relaxation like this, it is frequently observed that optical quality deteriorates with the storing time of the medium. This is considered that decomposition and separation may easily occur according to easiness to move of the contained molecules.

SUMMARY OF THE INVENTION

An object of the present invention is to provide an optical recording medium in which a diffraction efficiency is high, optical quality is suppressed from deteriorating, sensitivity is high and a recorded information is possibly stored over a long period.

According to one aspect of the present invention, an optical recording medium comprises a recording layer containing: a charge generation material generating an electron and a hole by light irradiation; a charge transport material transporting one of the electron and the hole; a charge trap which traps the transported one of the electron and the hole to separate the electron and the hole; and a non-linear optical material which changes optical properties of the recording layer in accordance with electric field formed by the electron and the hole being separated from each other, the non-linear optical material having an asymmetrical carbon atom and a cyclic group.

According to another aspect of the invention, an optical recording medium comprises a recording layer containing: a charge generation material generating an electron and a hole by light irradiation; a charge transport material transporting one of the electron and the hole; a charge trap which traps the transported one of the electron and the hole to separate the electron and the hole; and a non-linear optical material represented by the chemical formula (1):

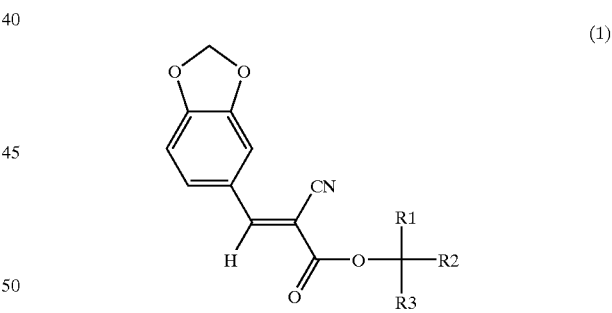

(1)

(where, in the chemical formula (1), R1 is a cyclic group, R2 and R3 are respectively an element which is selected from the group consisting of aromatic hydrocarbon groups, heterocyclic groups, aliphatic hydrocarbon groups, alicyclic hydrocarbon groups and hydrogen atom, and R1, R2 and R3 are different from one another).

According to another aspect of the present invention, an optical recording medium comprises a recording layer containing: a charge generation material generating an electron and a hole by light irradiation; a charge transport material transporting one of the electron and the hole; a charge trap which traps the transported one of the electron and the hole to separate the electron and the hole; and a non-linear optical material which changes optical properties of the recording layer in accordance with electric field formed by the electron and the hole being separated from one another, the non-linear optical material being a cyclic-group-containing constituent having: an inversion symmetric π-electron system; at least one of an electron donating group and an electron accepting group which are bonded to the inversion symmetric π-electron system; and an asymmetrical carbon atom.

Moreover, according to another aspect of the present invention, an optical recording apparatus comprises: an optical recording medium comprising a recording layer containing a charge generation material generating an electron and a hole by light irradiation, a charge transport material transporting one of the electron and the hole, a charge trap which traps the transported one of the electron and the hole to separate the electron and the hole, and a non-linear optical material which changes optical properties of the recording layer in accordance with electric field formed by the electron and the hole being separated from one another, the non-linear optical material having an asymmetrical carbon atom and a cyclic group; a light source emitting a light beam effective to the charge generation material; a beam splitter separating the light beam into a first light beam and a second light beam; a first optical device which is configured to provide information to be recorded, to the first light beam; and a second optical device which is configured to intersect the first light beam provided with the information and the second light beam within the recording layer, the intersected first and second light beams making an interference pattern to record the information as a change of the optical properties of the recording layer.

BRIEF DESCRIPTION OF THE SEVERAL VIEWS THE DRAWINGS

The features and advantages of the optical recording medium according to the present invention over the proposed medium will be more clearly understood from the following description of the embodiments of the present invention taken in conjunction with the accompanying drawings in which like reference numerals designate the same or similar elements or sections throughout the figures thereof and in which.

DETAILED DESCRIPTION OF THE INVENTION

Figure 1:
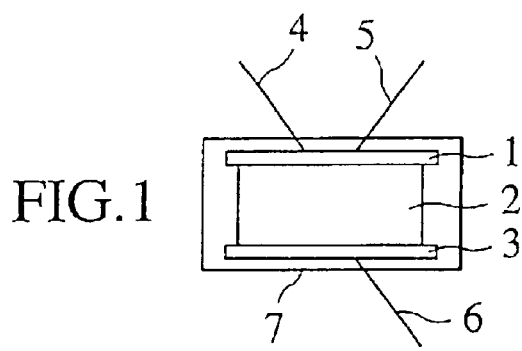
FIG. 1 is a schematic diagram showing one embodiment of the optical recording medium according to the present invention.

The photorefractive type optical recording medium has electric charge generating capability, electric charge transporting capability, electric charge trapping capability and a function for changing optical characteristics in accordance with an electric field, and one (carrier) of the electric charges, i.e. electron and hole, generated by irradiated light is spatially separated from the other of the electric charges owing to the electric charge transporting capability and electric charge trapping capability. As a result, an electric field is generated between the separated electric charges, resulting in variation in the optical characteristics such as optical density, refractive index, fluorescence quantum yield and reflectance, in particular in the refractive index. Accordingly, a pattern of light intensity is recorded as a variation of the optical characteristics. The optical density is defined as a value, $-\log(I/I_0)$, where $I_0$ is incident beam intensity, and I is transmitted beam intensity. The fluorescence quantum yield is defined as a ratio of the number of photons emitted as fluorescence from the material to that absorbed by the material.

A non-linear optical material is a component whose optical characteristics vary depending on an electric field, and the polling process is performed in order to make the most effective use of the properties of the non-linear optical material. However, the non-linear optical material molecules that are oriented by the application of the polling process tend to undergo relaxation and disturbance of the orientation due to heat or the like, and change in properties with time is also likely to occur. However, when the non-linear optical material is a compound that has an asymmetric carbon and contains a group of monocyclic or fused-ring structure, the molecules are easily oriented and the molecular orientation becomes difficult to relax and cause disturbance, resulting in suppressing the optical properties of recorded information from deteriorating.

That is, the optical recording medium of the present invention is one that has a recording layer that contains an electric charge generation material, an electric charge transport material, an electric charge trap and a non-linear optical material, and as the non-linear optical material to be contained, a compound that contains an asymmetric carbon and a monocyclic group or fused-ring-structured group is used. In accordance with the above construction, with the optical recording medium that is made higher in the diffraction efficiency and in the sensitivity, the optical quality of the record can be suppressed from deteriorating and the record can be operated for a longer time period. The non-linear optical material comprises a molecule that modulates the refractive index due to so-called Pockels effect, the molecule being an asymmetrical π-conjugated molecule that has both or either one of an electron donor group and an electron acceptor group.

In general, incorporation of an asymmetric carbon into a molecule causes a molecular asymmetry in a compound and imparts stereospecific properties to it, thus resulting in causing polarization in the molecular orientation and optical anisotropy. On the other hand, the monocyclic or fused-ring group is a three dimensionally bulky group, and its degree of freedom is low, not only in the case of cyclic group with an unsaturated bond but also with a saturated bond. That is, a change of three-dimensional arrangement in a cyclic group is far more restricted than that in an acyclic group, and it imparts rigidity to the molecule accordingly. Furthermore, its bulkiness tends to restrict degree of freedom in the three-dimensional arrangement between molecules. Accordingly, when the non-linear optical material in the recording medium is an asymmetric compound having a cyclic group, owing to the deviation in the molecular orientation and the restricted three-dimensional movement of the molecule, regularity of molecular orientation is easily caused and the movement of oriented molecules is restricted. As a result, even at a temperature equal to a glass transition temperature of the recording layer or more, the movement of the molecule tends to be restricted. Accordingly, in comparison with the case where an achiral non-linear optical material that does not have an asymmetric carbon is used, a molecular state that is oriented by the polling under a high temperature and high pressure can be maintained. Furthermore, owing to the restriction of the movement of the non-linear optical material molecules, other components are also restricted in the movement of molecules, and the optical quality of the optical recording medium is difficult to deteriorate during the storing. Such properties become further remarkable when the cyclic group directly bonds to the asymmetric carbon or rigidity of the molecule becomes higher as in the case where carbon that constitutes the cyclic group is an asymmetric carbon. Still furthermore, when the number of the cyclic groups and the number of condensations in the cyclic group increase, the rigidity of the molecule becomes higher.

Accordingly, in the present invention, a compound whose optical properties (absorption coefficient, refractive index, emission efficiency or reflectance) vary, similarly to the existing non-linear optical materials, in accordance with an electric field, and which has, as mentioned above, a cyclic group or asymmetric carbon is used as a non-linear optical material.

The cyclic group of the non-linear optical material of the present invention may be any one of aromatic hydrocarbon groups, heterocyclic groups and alicyclic hydrocarbon groups, may be either one of monocyclic or fused ring group, and may have a substituted group or be a non-substituted group. As specific examples of the cyclic group, the following groups can be cited.

As the aromatic hydrocarbon groups, groups having an aromatic cyclic structure such as those of, for example, benzene, naphthalene, anthracene, phenanthrene, tetralin, azulene, biphenylene, and acenaphtylene can be cited.

As the heterocyclic groups, groups having ring structure such as those of, for instance, furan, thiophene, pyrrole, 2H-pyrrole, pyrroline, 2-pyrroline, pyrrolidine, oxazole, isoxazole, thiazole, isothiazole, imidazole, 2H-imidazole, 2-imidazoline, imidazolidine, pyrazole, 3-pyrazoline, pyrazolidine, triazole, furazan, tetrazole, pyran, 4H-thiin, pyridine, piperidine, oxazine, morpholine, thiazine, pyridazine, pyrimidine, pyrazine, piperazine, triazine, benzofuran, isobenzofuran, benzothiophene, indole, indoline, isoindole, benzoxazole, benzothiazole, indazole, benzimidazole, chromene, chroman, isochroman, quinoline, isoquinoline, cinnoline, phthalazine, quinazoline, quinoxaline, dibenzofuran, carbazole, xanthene, acridine, phenanthridine, phenanthroline, phenazine, phenoxazine, thianthrene, indolizine, quinolizone, quinuclidine, naphthyridine, purine, pteridine, fluorene, and phenothiazine can be cited.

As the alicyclic hydrocarbon groups, groups having a ring structure such as those of, for instance, cyclopropane, cyclobutane, cyclopentane and cyclohexane can be cited.

As an example of cyclic groups where the carbon that constitutes the cyclic group is the asymmetric carbon, for instance, 2-(4H-azepinyl) group, 3-(4H-azepinyl) group, 4-(4H-azepinyl) group, 2-aziridyl group, 2-azetedinyl group, 3-azetedinyl group, 2-pyrrolidinyl group, 3-pyrrolidinyl group, 2-piperidyl group, 3-piperidyl group, 4-pyrrolinyl group, and 5-pyrrolinyl group can be cited.

The substituent group that bonds with the asymmetric carbon may be any one of the aforementioned cyclic groups, non-cyclic hydrocarbon groups, the acyclic hydrocarbon groups that bond with the cyclic group, hydrogen, characteristic groups and the acyclic hydrocarbon groups that bond with the characteristic group. As the acyclic hydrocarbon groups, saturated aliphatic hydrocarbon groups such as, for instance, methyl group, ethyl group, propyl group, isopropyl group, butyl group, isobutyl group and so on, and unsaturated aliphatic hydrocarbon groups such as, for instance, vinyl group can be cited; as the characteristic groups, for instance, hydroxy group, oxymethylene group, acyloxy group, amino group, N-substituted amino group, carbonyl group and so on can be cited; and as the acyclic hydrocarbon group that bonds with the characteristic group, groups in which such characteristic group is substituted for the acyclic hydrocarbon group can be cited.

The preferable examples of the non-linear optical material of the present invention include ester type compounds that contain asymmetric carbon and cyclic group can be cited. There is an advantage in that these compounds can be prepared through esterification reaction with alcohol compound, with a relatively easy process asymmetry is introduced into a molecule to synthesize an asymmetric compound, that is, an optically active substance can be easily obtained.

As an preferable example of the ester type non-linear optical material, there is an asymmetric tertiary alcohol ester compound that has, for instance, —COO—C (—R1) (—R2) (—R3) group (here, R1≠R2≠R3≠R1, and at least one of R1, R2 and R3 contains cyclic group). This can be obtained by carrying out an esterification reaction, according to the ordinary method, between an asymmetric tertiary alcohol compound in which a substituent group having a cyclic group is combined with the asymmetric carbon and a carboxy compound. As particularly effective compounds of this type, compounds such as shown in the following formula (1) can be cited.

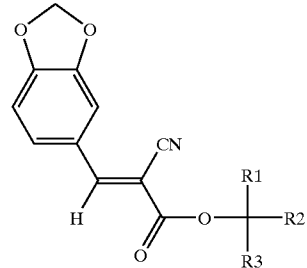

(1)

(here, R1=mono-cyclic or fused-ring group, and R1≠R2≠R3≠R1)

The groups, R1, R2 and R3, in the above formula (1) are respectively one of substituted or non-substituted aromatic hydrocarbon groups, heterocyclic groups, aliphatic hydrocarbon groups and alicyclic hydrocarbon groups, or hydrogen atom. For the non-substituted aromatic hydrocarbon groups, heterocyclic groups, aliphatic hydrocarbon groups and alicyclic hydrocarbon groups that are introduced as the groups, R1, R2 and R3, the above-illustrated compounds can be applied. These non-linear optical materials can be prepared according to the method disclosed in Japanese Patent Application Laid-Open No. PH05-5913.

In organic non-linear optical materials, non-localized π electrons mainly contribute in non-linear polarization, and it is usually utilized to cause polarization of electrons that is called Elecmery effect to the non-localized π electrons by endowment of the substituent group. Specifically, in many cases, an electron donor group and/or an electron acceptor group is bonded with a π-electron system (conjugated multiply bonded system) that has inversion symmetry such as benzene ring, naphthalene ring, anthracene ring, pyrene ring and the like, thereby electrons are caused to polarize, resulting in an increase in dipole moment that is called as mesomeric moment. Accordingly, in the present invention, a cyclic group-containing compound that contains an inversion symmetric π-electron system that has an electron donor group or an electron acceptor group and has an asymmetric carbon as mentioned above is used as the non-linear optical material. If the inversion symmetric π-electron system is an aromatic ring such as benzene ring, naphthalene ring and the like, this can concurrently work as the aforementioned cyclic group. As the electron acceptor groups, there are nitro group, cyano group, sulfonic acid group, aldehyde group, carboxyl group, alkoxycarbonyl group and so on, and as the electron donor group, there are amino group, mono- or di-alkylamino group such as dimethyl amino group, hydroxy group, alkoxy group, alkyl group, halogen group, aryl group, juloridino group and so on.

The non-linear optical material of the present invention may be supported by polymer chains, and a mode of polymer in which a component for the non-linear optical material having the cyclic group and the asymmetric carbon such as mentioned above is made into a complex compound together with other functional component (a component that works as the electric charge generation material, the electric charge transport material or the charge trap) is furthermore effective.

In the optical recording medium of the present invention, a recording layer contains, together with the non-linear optical material as mentioned above, the electric charge generation material, electric charge transport material and the charge trap. As far as the photorefractive effect can be exhibited, each of these components may be a single molecule or polymer molecule. The charge trap may be omitted when other components in the recording layer exhibit the trapping function as well.

The electric charge generation material, when recording light that is irradiated is absorbed, generates plus and minus electric charges (holes and electrons). That is, the electric charge generation material has to be one that absorbs the recording light. However, if an electric charge generation material whose optical density to the recording light is very high is used, the recording light may not reach the electric charge generation material that is in the depth of the recording layer. Accordingly, it is preferable for the optical density when the recording layer is formed as the recoding element is in the range of from $10^{-6}$ to $10$ $(cm^{-1})$.

As the compounds that can be used as the electric charge generation material in the present invention, the following substrates can be cited, for instance, metallophthalocyanines, metal-free phthalocyanines, phthalocyanine dye/pigment of derivatives of metallophthalocyanines and metal-free phthalocyanines, naphthalocyanine dye/pigment, azo based dye/pigment of monoazo, bisazo or trisazo type, perylene based dye/pigment, indigo based dye/pigment, quinacridon based dye/pigment, polycyclic quinones dye/pigment such as anthraquinone, anthanthrone and so on, cyanine based dye/pigment, charge transfer complex compounds composed of an electron acceptor substance and an electron donor substance typical in, for instance, TFT-TCNQ, azulenium salts, fullerenes typical in $C_{60}$ and $C_{70}$ and derivatives thereof, metanofullerene, and so on. Among these, charge transfer complex compounds are suitable for the electric charge generation material of the optical recording medium of the present invention.

The charge transfer complex compound that can be used for the electric charge generating site is made of a combination of a donating molecule and an accepting molecule, and these can be selected respectively from the following molecule groups to use.

The group of acceptor molecules includes nitro compounds such as 1,3,5-trinitro benzene, dinitro benzene, nitrophenyl-2,4,6-trinitrophenol, 2,4,6-trinitrochlorobenzen, chlorobenzen, 9-nitroanthracene, 3,6-dinitro carbazole, 1-(benzamide)-4-nitronaphthalene; cyano compounds such as tetracyanoethylene, 9-cyanoanthracene, phenyl-p-bis (methylene malononitrile), tetracyanoquinodimethane and so on; acids such as hydrochloric acid and anthone dicarboxylic acid; acid anhydrides such as phthalic anhydride and so on; halides such as tetrabromo-p-xylene, triphenyl chloromethane and so on; quinones such as chloranil, acenaphthenquinone, 2,6-dimethyl-p-benzquinone and so on; aromatic ketones such as benzil, benzoin, 2,4,7-trinitro fluorenone, 2,4,5,7-tetranitro fluorenone, boron diketonate, pyromeritic dianhydride and so on; and fullerenes and carbon nanotubes typical in $C_{60}$ and $C_{70}$. Furthermore, electron-transporting agents, which belong to the electric charge transport materials, can be used.

On the other hand, the group of donor molecules includes hydrazone compounds, triphenyl amines, triphenyl methanes, butadienes, stilbenes, and their derivatives. Still furthermore, nitrogen-containing cyclic compounds such as indole, carbazole, oxazole, iso-oxazole, thiazole, imidazole, pyrazole, oxadiazole, pyrazoline, thiathiazole, and triazole and their derivatives can be used. Furthermore, there are dibenzothiophene, phenothiazine, tetramethyl-o-phenylenediamine and so on. Still furthermore, hole-transporting agents, which belong to the electric charge transport materials, can be used.

The electric charge transport material that can be used in the present invention is a component that has the electric charge transporting function for transporting electrons or holes, and the component may be a single molecule or a polymer molecule which may be a copolymer with other polymer constituent. For instance, nitrogen-containing cyclic compounds such as indole, carbazole, oxazole, iso-oxazole, thiazole, imidazole, pyrazole, oxadiazole, pyrazoline, thiathiazole and triazole, derivatives thereof or compounds having a main chain or a side chain containing one or more of these nitro-containing cyclic compound; hydrazone compounds, triphenyl amines, triphenyl methanes, butadienes, stilbenes, quinone compounds such as anthraquinone, diphenoquinone and so on or derivatives thereof or compounds having a main chain or a side chain containing one or more of these quinone compounds, fullerene such as $C_{60}$ and $C_{70}$ and derivatives thereof can be cited. π-conjugated polymer molecules such as polyacetylene, polypyrrole, polythiophene and polyamiline or oligomer, sigma-conjugated polymer molecules such as polysilane, polygermane and so on or oligomer, polycyclic aromatic compounds such as anthracene, pyrene, phenanthrene, coronene and so on can also be used. Furthermore, the following compounds can be used as well.

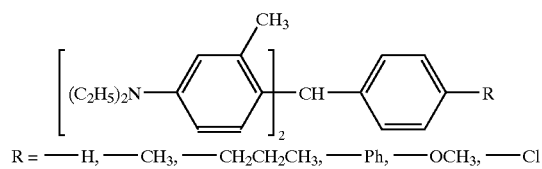

R = —H, —CH₃, —CH₂CH₂CH₃, —Ph, —OCH₃, —Cl

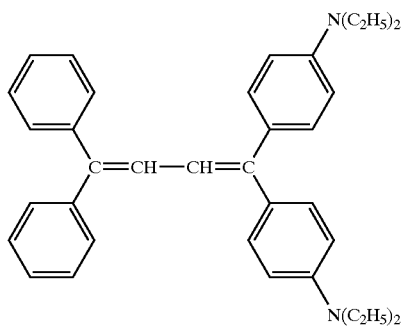

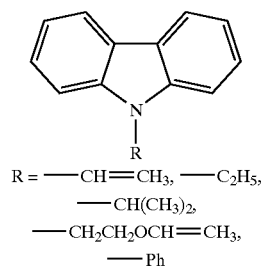

R = —CH=CH₃, —C₂H₅,
—CH(CH₃)₂,
—CH₂CH₂OCH=CH₃,
—Ph

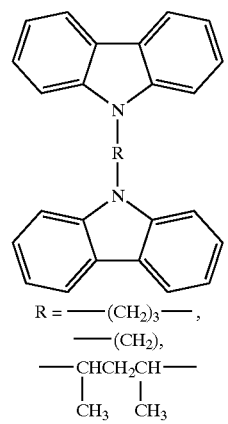

R = —(CH₂)₃—,
—(CH₂),
—CHCH₂CH—
    |       |
    CH₃  CH₃

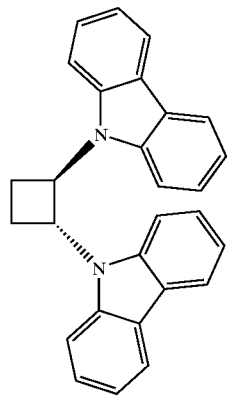

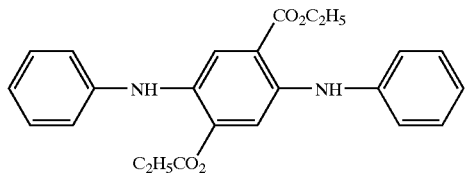

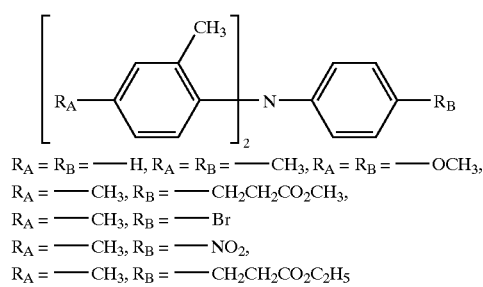

R$_A$ = R$_B$ = —H, R$_A$ = R$_B$ = —CH₃, R$_A$ = R$_B$ = —OCH₃,
R$_A$ = —CH₃, R$_B$ = —CH₂CH₂CO₂CH₃,
R$_A$ = —CH₃, R$_B$ = —Br
R$_A$ = —CH₃, R$_B$ = —NO₂,
R$_A$ = —CH₃, R$_B$ = —CH₂CH₂CO₂C₂H₅

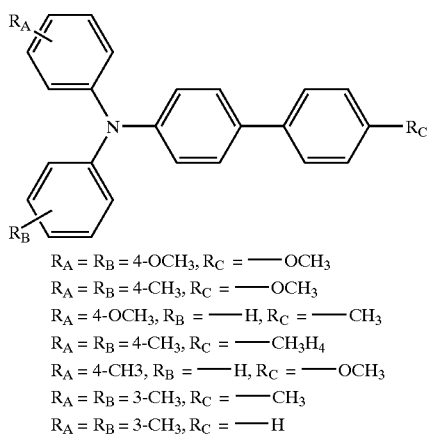

R$_A$ = R$_B$ = 4-OCH₃, R$_C$ = —OCH₃
R$_A$ = R$_B$ = 4-CH₃, R$_C$ = —OCH₃
R$_A$ = 4-OCH₃, R$_B$ = —H, R$_C$ = —CH₃
R$_A$ = R$_B$ = 4-CH₃, R$_C$ = —CH₃H₄
R$_A$ = 4-CH₃, R$_B$ = —H, R$_C$ = —OCH₃
R$_A$ = R$_B$ = 3-CH₃, R$_C$ = —CH₃
R$_A$ = R$_B$ = 3-CH₃, R$_C$ = —H

-continued
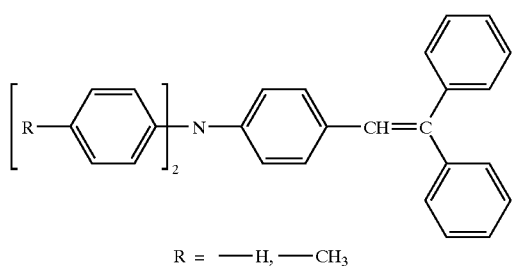 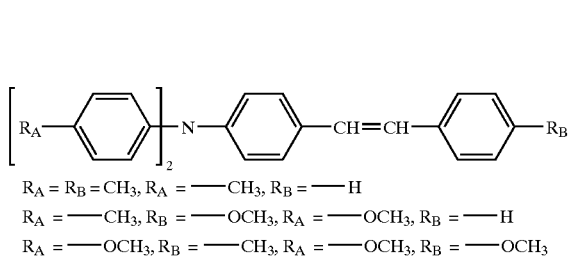
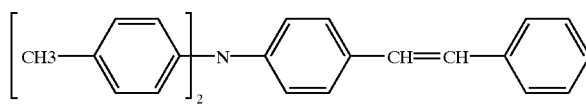 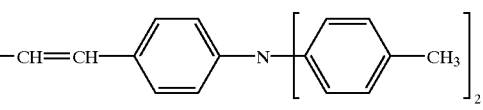
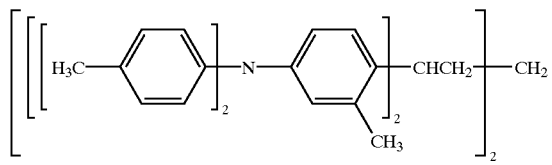 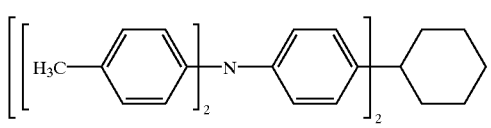
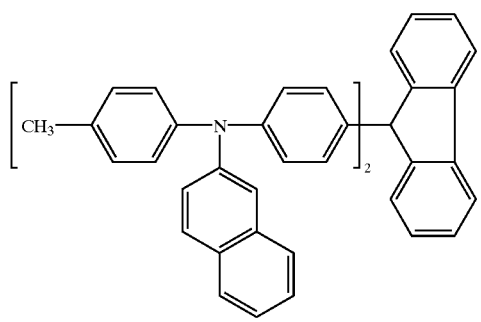 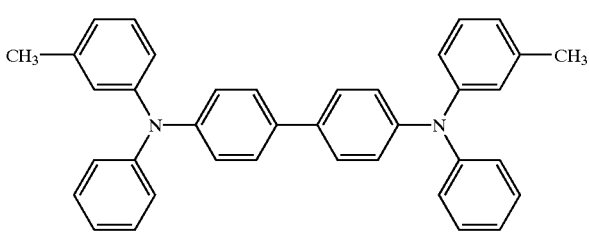
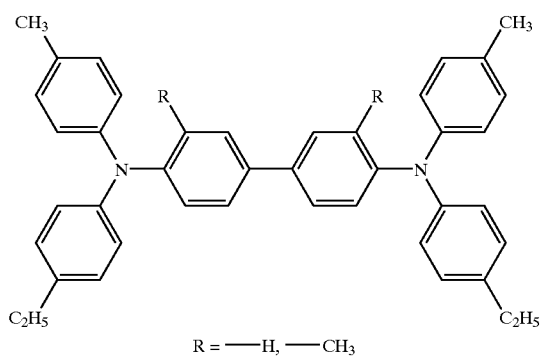
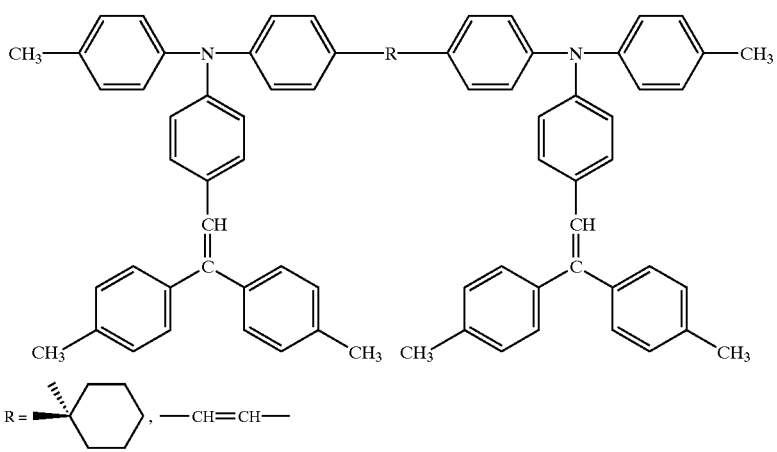

-continued
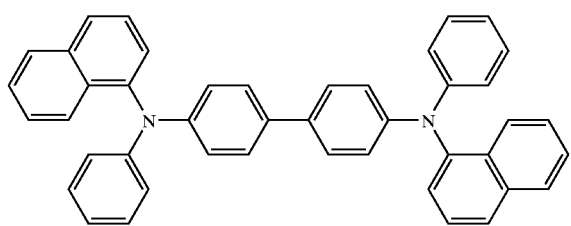
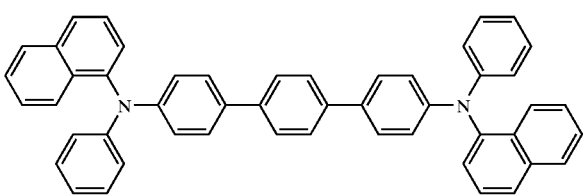
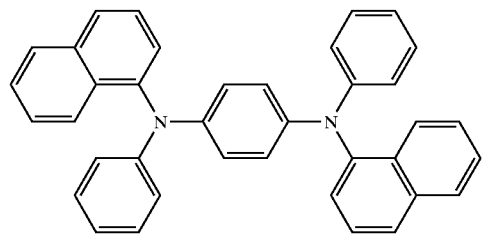
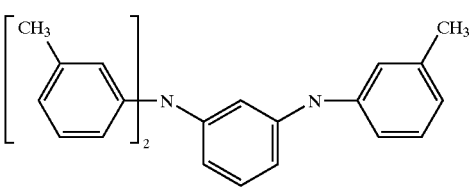
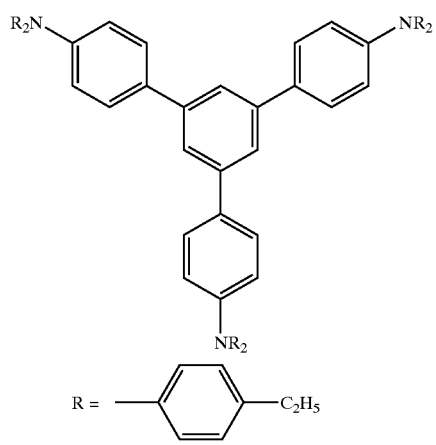
R = 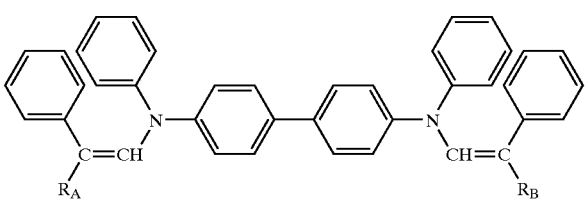
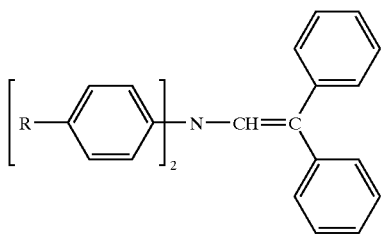
R = —CH₃, —H
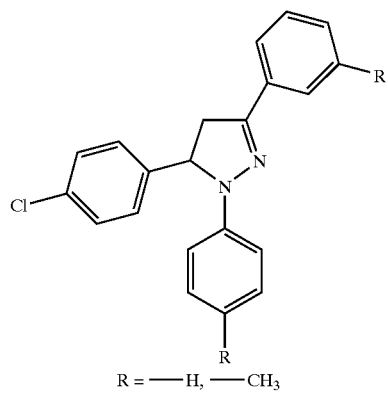
R = —H, —CH₃
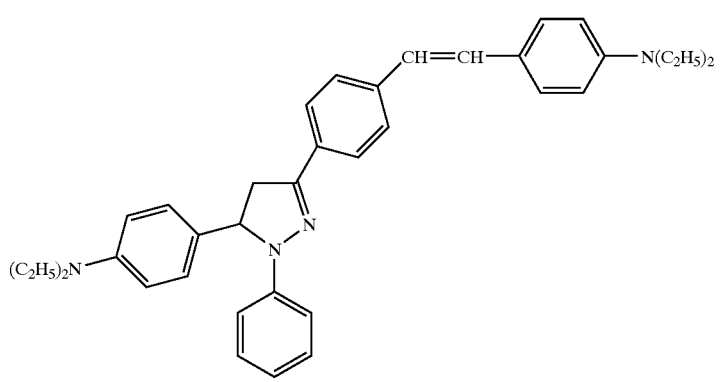

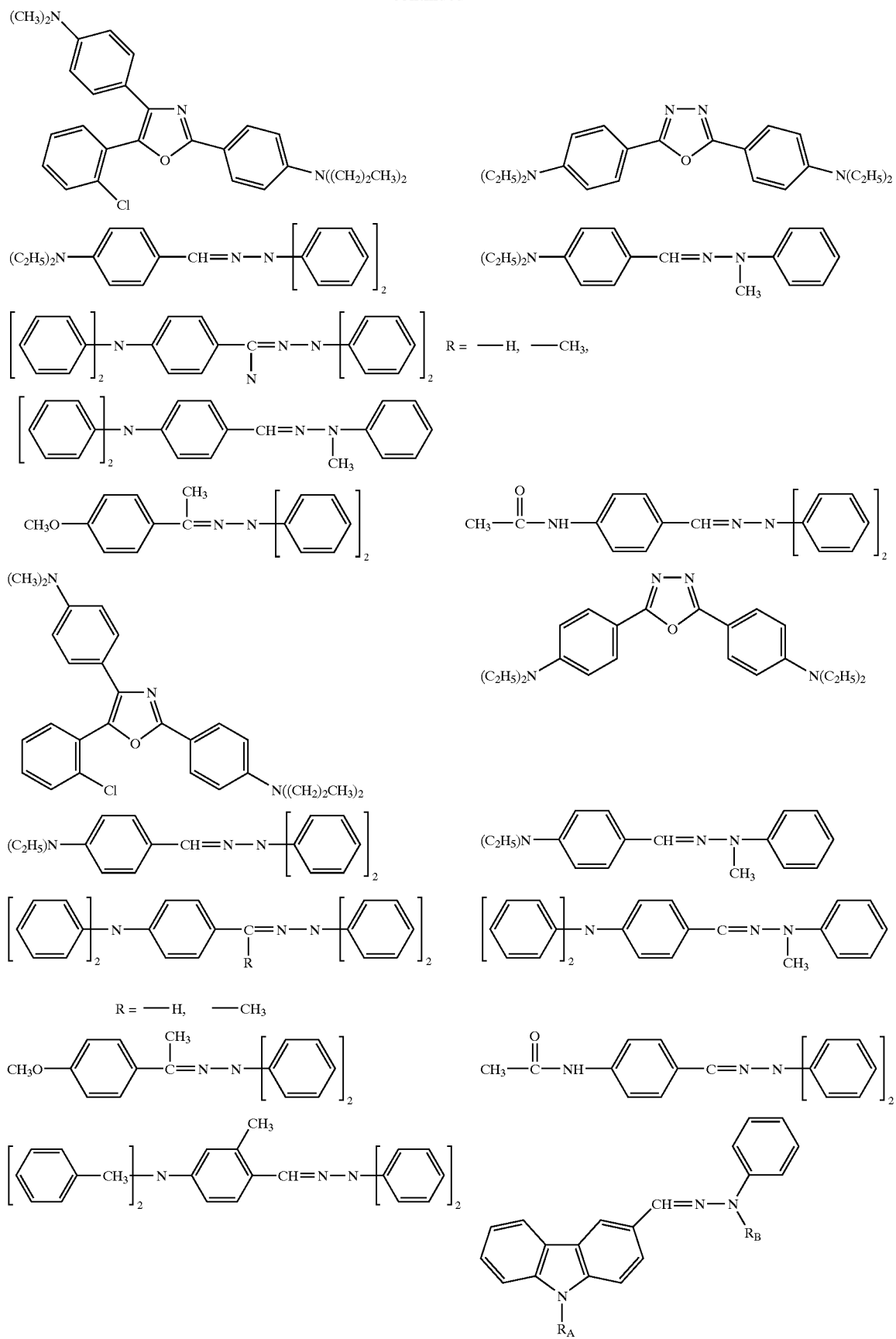

-continued
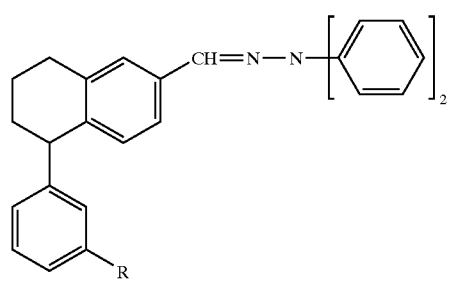 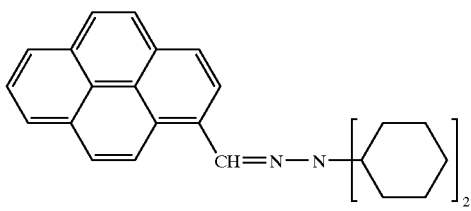
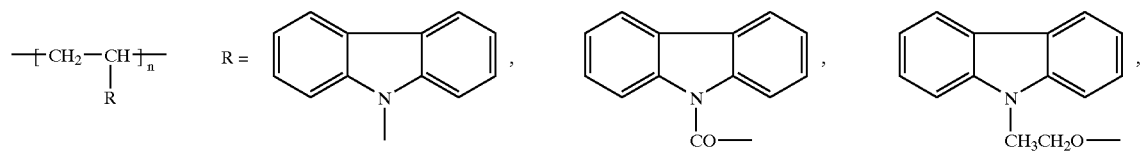
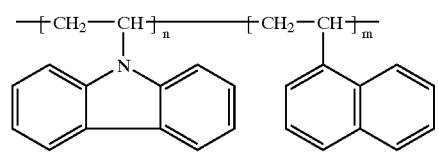 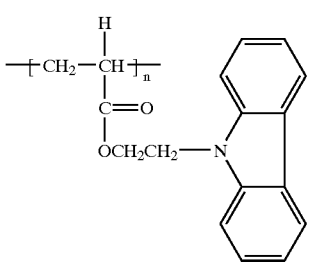
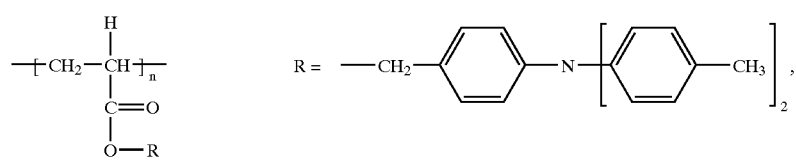 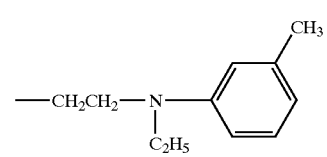
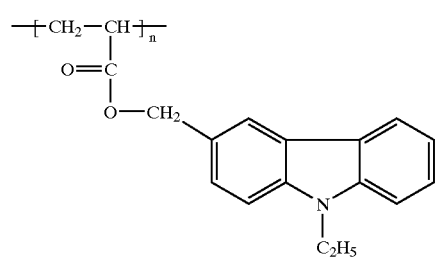 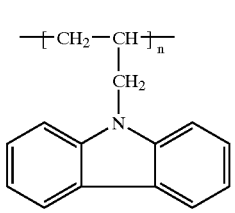 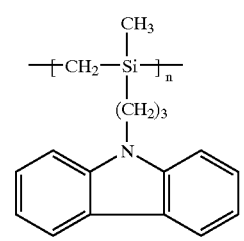
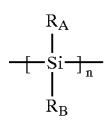
$R_A =$ —Ph, $R_B =$ —CH$_3$
$R_A =$ —C$_6$H$_{11}$, $R_B =$ —CH$_3$
$R_A =$ —(CH$_2$)$_2$CH$_3$, $R_B =$ —CH$_3$
$R_A =$ —Ph, $R_B =$ —C$_2$H$_5$
$R_A =$ —Ph, $R_B =$ —(CH$_2$)$_3$—CH$_3$
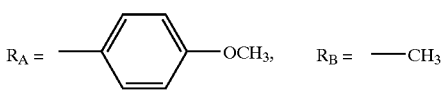, $R_B =$ —CH$_3$
$R_A = R_B =$ —(CH$_2$)$_3$—CH$_3$
$R_A =$ —(CH$_2$)$_3$—CH$_3$, $R_B =$ —(CH$_2$)$_4$—CH$_3$
$R_A = R_B =$ —(CH$_2$)$_5$—CH$_3$,
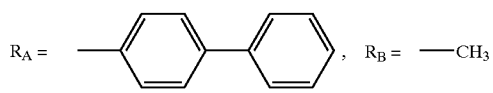, $R_B =$ —CH$_3$ -continued
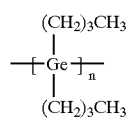
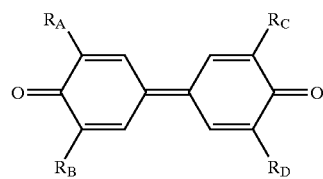
R_A = —CH₃,
R_C = R_D = -γ—C₄H₉
R_A = —CH₃, R_B = -γ—C₄H₉
R_C = R_D = —CH₃, -γ—C₄H₉
R_A = R_B = —CH₃,
R_C = R_D = -γ—C₄H₉
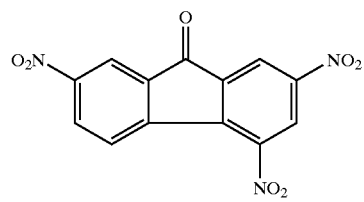
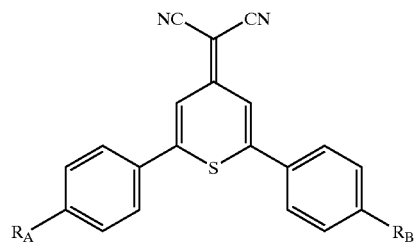
R_A = —H, R_B = —CH₃
R_A = R_B = -i—C₃H₇
R_A = -i—C₃H₇,
R_B = [thiophene]
R_A = -i—C₃H₇,
R_B = [thiophene SO]
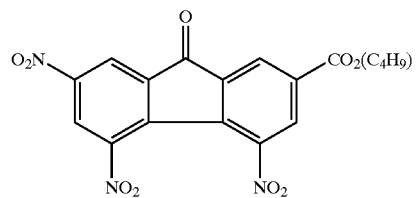
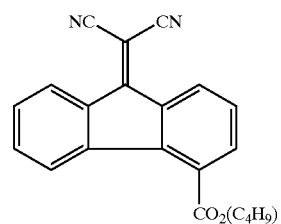
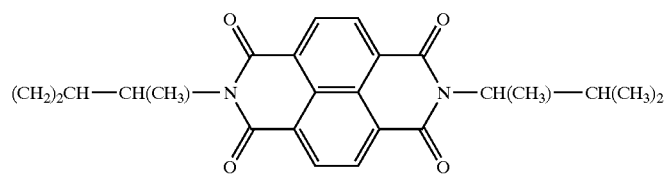
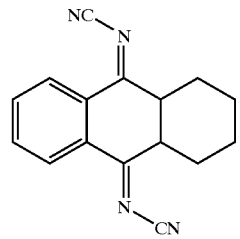
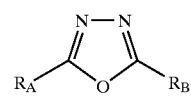
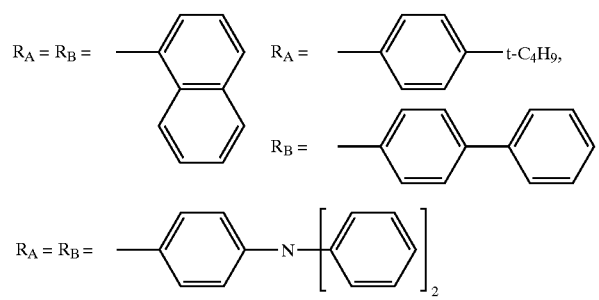
R_A = R_B = —[naphthyl]    R_A = —[phenyl]—t-C₄H₉,
R_B = —[biphenyl]
R_A = R_B = —[phenyl]—N[phenyl]₂
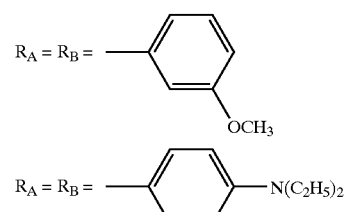
R_A = R_B = —[phenyl-OCH₃]
R_A = R_B = —[phenyl]—N(C₂H₅)₂

-continued

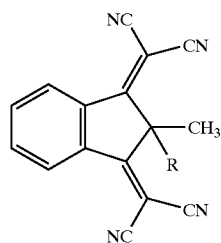

R = —C$_5$H$_{11}$
—CH$_2$CH═CH$_2$

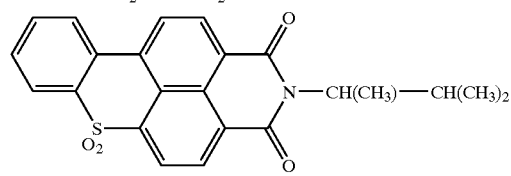

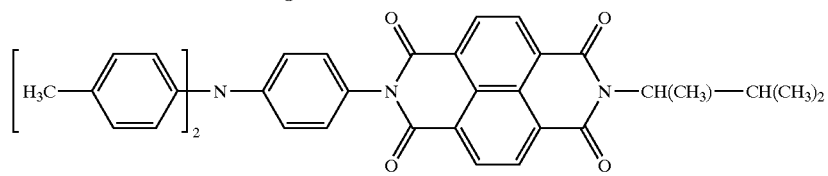

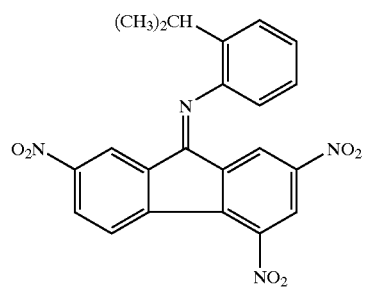

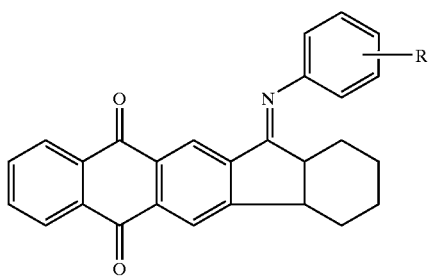

R = —CH$_3$, —CH$_2$CH$_3$

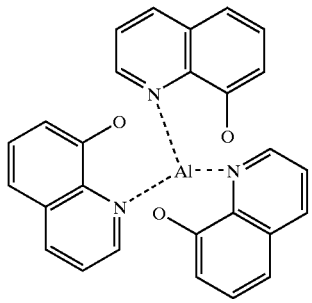

The charge trap is a compound that holds one electric charge (called as carrier) that is generated from the electric charge generation material and transported by the electric charge transport material, and has a group capable of donating and accepting the electric charge. Compounds very low in hole transporting ability such as, for instance, 2,5-bis(4-diethylaminophenyl)-1,3,4-oxadiazole and so on, and ones that are low in ionization potential among the aforementioned examples of the electric charge transport materials can be cited. When the polymer component is introduced in the electric charge generation material or electric charge transport material, the polymer component may work as the charge trap.

The recording layer of the optical recording medium of the present invention can be produced in the following way. Specifically, the non-linear optical material, the electric charge generation material, the electric charge transport material and the charge trap such as mentioned above are dissolved in a solvent to prepare a solution containing these components, and the solvent is vaporized from the solution, thereby the recording layer is produced. Alternatively, it is also possible to produce without employing the solvent, for instance, by heating a mixture of these components and then rapidly cooling it. The obtained recording layer, as necessity arises, can be used, for instance, in the form of optical recording medium 7 as shown in FIG. 1 in which the recording layer 2 is sandwiched between a pair of transparent substrates 1 and 3. If the recording layer is a film that has sufficient strength to maintain a shape thereof, it can be used singly as it is, as the optical recording medium. Alternatively, by omitting the substrate 1, the recording layer 2 may be used in a state supported by the transparent substrate 3. A voltage for subjecting the polling treatment by which molecules are oriented can be preferably applied with the transparent electrodes that sandwich the optical recording medium. In the present invention, it is found by monitoring the change with time of the molecular orientation after the polling process that the optical recording medium of the present invention has a longer relaxation time.

The contents of the respective components of the optical recording medium of the present invention are appropriately determined in accordance with a wavelength of the recording light, a wavelength of the reproducing light, a film thickness of the recording layer and optical properties of the substrate to be used.

Since the electric charge generation material absorbs the recording light, the content thereof is controlled so that the optical density of the recording medium be lower than the upper limit that the recording light can penetrate the medium. Accordingly, though a suitable amount thereof is different depending on the absorption coefficient thereof, by and large, it is preferable for 50% or more of the recording light to pass through the medium. In accordance with this, the electric charge generation material is mixed at a ratio in the range of, for instance, approximately 0.01% by weight to 50% by weight with respect to the recording medium. Since it is desirable for the interference pattern to be possibly recorded deeper in a thickness direction of the recording layer, it is preferred for the electric charge generation material to be mixed in the range of substantially 0.1% by weight to 10% by weight.

Since the electric charge transport material is necessary to transport the carriers that the electric charge generation material generates, its content is appropriately determined according to transporting capability thereof. Accordingly, though different depending on density thereof and electric charge transporting characteristics, it is mixed at a ratio in the range of substantially 1% by weight to 80% by weight with respect to the recording medium. The preferable content is substantially in the range of from 20% by weight to 50% by weight.

The electric charge trap is usually mixed in the range of substantially 0.1% by weight to 50% by eight. It is preferably mixed in the range of approximately 0.1% by weight to 30% by weight. In some cases, the charge trap also absorb the recording light or reproducing light, and the content of the charge trap in that time is lowered, in many cases, to in the range of 0.01% by weight to 10% by weight.

The non-linear optical material is mixed so as to exhibit electro-optical effect and usually contained in the range of from 5% by weight to 90% by weight with respect to the recording medium. It preferable content is in the range of from 30% by weight to 60% by weight. In some cases a material that can absorb the recording light or the reproducing light is used in order to enhance Pockels effect and the content of the non-linear optical material in that case is frequently lowered to in the range of substantially 5% by weight to 30% by weight.

In the recording layer of the optical recording medium of the present invention polymer or the like, in addition to the aforementioned functional components, can be blended as a matrix as necessity arises. The content of the matrix, since it may influence on the optical uniformity and shelf life of the optical recording medium, is appropriately determined according to the kind and compounding of the aforementioned functional components.

When information is recorded on the optical recording medium, the holographic method can be used in the present invention. In the holographic method, as shown in FIG. 1, an information-added signal light (recording light) 4 and a reference light that is coherent with respect to the signal light 4 are entered so as to cross each other in the optical recording medium. At the point where the two beams cross each other, an interference pattern is formed and recording of this pattern make the information recorded. That is, the information is added to one of said two lights and the interference pattern generated between the other one is recorded. At this time, there is generated an optical path difference between said two lights. Accordingly, if a light that is short in a coherence length is used, there is generated no interference pattern. Therefore, it is preferable to use a laser that has a coherence length longer than the optical path difference. When taking applications to terminals for use in computers, video-edition, or memories for use in database into consideration, the optical path difference in a device is considered to be normally substantially 1 cm or more. Accordingly, gas lasers and semiconductor lasers, in particular, semiconductor lasers whose coherence length is made longer by applying feedback operation can be preferably used as a light source.

In the optical recording medium 7 therein the information is recorded, if a reference light 5 is irradiated as the reading light as shown in FIG. 1, a reproduction light 6 having a spatial intensity distribution same with the signal light 4 is reproduced from the recorded interference pattern.

Figure 2:
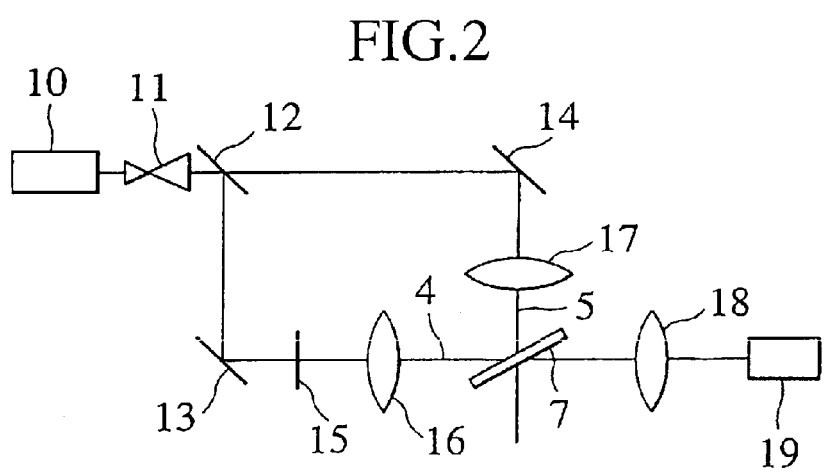
FIG. 2 is a schematic diagram showing one example of an optical recording apparatus for recording and/or reproducing information on and/or from the optical recording medium according to the present invention.

FIG. 2 shows one example of the recording apparatus for recording information in the optical recording medium according to one embodiment of the present invention.

As shown in FIG. 2, an optical recording medium 7 shaped into a circular disk is prepared at first. Then, an image display element 15 is disposed on one side of the optical recording medium 7, and a reading device 19 is disposed on the opposite side of the optical recording medium 7. It is desirable that this reading device 19 is disposed perpendicular to the axis of beam to be irradiated from an image display element 15 onto the optical recording medium 7. As for this image display element 15, various kinds of device such as a liquid crystal, a digital mirror array, a Pockels readout optical modulator, a multi-channel spatial modulator, a Si-PLZT element, a deformed surface type element, an AO or EO modulating element and a magneto-optical effect element can be employed. As for the reading device 19, any kind of photoelectric converting device can be employed. For example, it is possible to employ a CCD, a CMOS sensor, a photodiode, a photoreceptor and a photomultiplyer tube.

Although the beam is assumed to pass through the image display element 15 in FIG. 2, this image display element 15 may be constituted by an element that is designed to reflect the beam like a mirror array.

The recording of information to the optical recording medium can be performed according to the following procedures. As for the light source for the recording, it is required to be a coherent light that is represented by a laser. Therefore, an embodiment, where a laser is employed will be explained herein. The wavelength of the laser can be selected depending on the components of the optical recording medium to be employed. More specifically, the wavelength of the laser can be selected according to the charge-generating material. In the case where the optical recording medium in which the phenomenon changing the optical characteristics when the trapping material retains charge is used, the wavelength is selected corresponding to the trapping material. As for the laser 10, any kind of conventional laser, such as gas laser, liquid laser, solid laser, or semiconductor laser can be employed. The output emitted from the laser 10 is split into two by using a beam splitter 12 for instance. Namely, one of them is employed as a reference beam 5, and the other is employed as a signal beam 4, thus enabling it pass through the image display element 15.

In the recording procedures of information using this apparatus, the signal beam 4 and the reference beam are irradiated onto the optical recording medium 7 so as to enable these beams to intersect with each other in the recording layer. Specifically, this can be achieved by the following procedures. Namely, the beam emitted from the laser 10 is expanded to a parallel beam by a beam expander 11, and then, split into two by using a beam splitter 12 for instance. The information to be recorded is digitized in advance, and the image pattern corresponding to this digitized information is input in advance into the image display element 15. One of the beam that has been split by the beam splitter 12 is irradiated, via the mirror 13, onto the image display element 15 so as to spatially modulate it in accordance with data for recording the distribution of intensity of beam for instance, thereby making it the signal beam 4. Further, this signal beam 4 is converged by the lens 16 and irradiated onto the optical recording medium 7. If the focal distance of the lens 16 is defined as f1, the distance between the image display element 15 and the lens 16 should preferably be adjusted identical with this f1. Concurrently, the reference beam 5 is irradiated onto the optical recording medium 7 so as to enable the reference beam 5 to intersect with the signal beam 4. By the way, the reference beam 5 is reflected with a mirror 14 and then converged in advance by the lens 17.

Due to the interference pattern that has been generated by the overlapping of the signal beam 4 with the reference beam 5, an inner electric field is caused to generate. As a result, the modulation of optical characteristics is caused to occur in the recording layer, thus forming a diffraction grating. On this occasion, by changing the incident angle of the reference beam and/or the incident angle of the signal beam, a plurality of interference fringes can be formed in the overlapping region. Alternatively, by rotating the optical recording medium 7 relative to the direction of incident beam, the incident angles of the reference beam and the signal beam can be varied. Furthermore, when the position to which the laser beam is irradiated is displaced relative to the overlapped position of the signal beam and the reference beam by a magnitude of ½ to ¹⁄₁₀₀₀, a plurality of interference fringes can be formed in the overlapping region of two beams.

On the occasion of reading the information that has bee recorded, the signal beam 4 was shut off, and only the reference beam 5 is irradiated onto the optical recording medium 7. Namely, the reference beam 5 can be employed also as reading beam. On this occasion, a reading beam having the same spatial intensity distribution as that of the signal beam 4 can be read due to the interference fringes that have been recorded. Therefore, after being permitted to pass through the lens 18, this reading beam is read out by the reading device 19. From the intensity distribution of the beam read out in this manner, reading recorded information can be realized. If the focal distance of the lens 18 is defined as f2, the distance between the lens 16 and the lens 18 should preferably be made equal to f1+f2, and the distance between the lens 18 and the reading device 19 should preferably be made equal to f2.

In this embodiment, the wavelength of the light source employed in the reading is the same as that employed in the recording. However, it is also possible to employ a light source of different wavelength. Namely, when the thickness of recording layer is not more than 0.5 mm, even if a light source of slightly different wavelength from that employed in the recording is employed in the reading, the reading of the recorded information can be realized. In that case, the angle of the reading beam may be slightly altered from that of the recording beam so as to enhance the intensity of the diffraction beam.

In this embodiment, the reference beam 5 is also converged by the lens 17. However, the reference beam may not necessarily be converged. Namely, the lens 17 may be omitted by interposing the beam expander 11 at any location between the laser 10 and the image display element 15.

Figure 3:
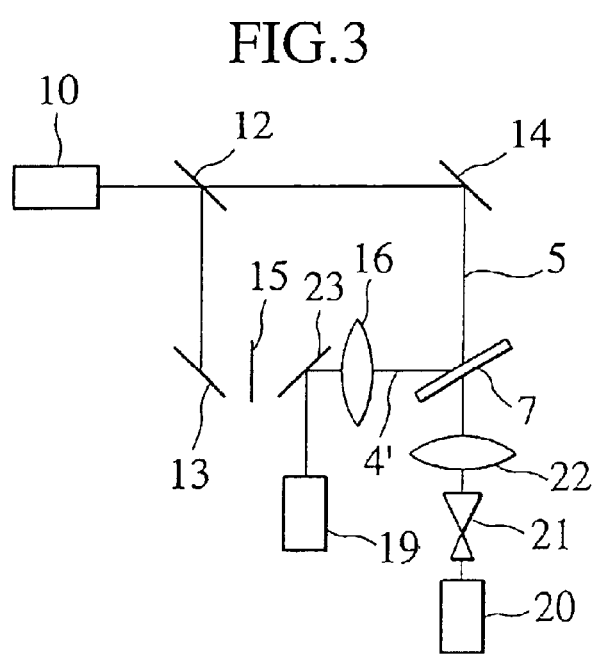
FIG. 3 is a schematic diagram showing another example of the optical recording apparatus for recording and/or reproducing information on and/or from the optical recording medium according to the present invention.

It is also possible to perform phase conjugated reading on the occasion of reading the recorded information. The process thereof will be explained with reference to FIG. 3. In FIG. 3, the coherent beam of the same wavelength as that employed in the recording is irradiated in the opposite direction to that employed in the recording.

Namely, the beam emitted from the laser 20 which is designed to emit the same wavelength as that employed in the recording is permitted to expand in diameter by the beam expander 21 for instance, and then, irradiated, by using the lens 22, onto the optical recording medium 7 from the direction which is quite opposite from that when the reference beam was irradiated thereto. As a result, by the diffraction grating that has been recorded in the optical recording medium 7, a virtual image which is opposite in direction from that forwarded by the signal beam 4 will be regenerated. After being passed through the lens 16, the virtual image is permitted to reflect by the beam splitter 23 so as to be read by the reading device 19. In the same manner as on the occasion of recording, the distance between the lens 16 and the reading device 19 should preferably be made equal to the focal distance of the lens 16. It is also possible in this phase conjugated reading to employ a coherent beam having a slightly different wavelength from that employed in the recording. In that case, the incident angle of the reading beam should preferably be slightly adjusted so as to make the beam axis of the virtual image completely align with the axis of signal beam 4.

If the reference beam 5 is not converged on the occasion of recording, it is possible to omit the beam splitter 21 and the lens 22 even in this phase conjugated reading.

The information recorded in the optical recording medium may be erased if desired. For example, by irradiating a beam having a uniform intensity distribution all over a larger region as compared with the recording region, or by heating the optical recording medium up to a temperature lower than the glass transition point thereof, the recorded information can be erased. Alternatively, the recorded information can be erased by uniformly irradiating a beam having a wavelength against which the trapping material is incapable of absorbing if it is in the neutral state but is capable of absorbing if it is in the ionized state.

The methods of recording and reading information in the optical recording medium according to one embodiment of the present invention are not confined to the aforementioned examples but can be variously modified. For example, the signal beam 4 and the reference beam 5 may be introduced into the optical recording medium 7 from the different side thereof, respectively.

If the information is recorded as a digital data, a plurality of pixels of the image display element 15 may be represented as a single data.

If the information is to be supplied by the intensity distribution of signal beam, the intensity of beam at the bright portion and at the dark portion may not be uniform throughout the diameter of beam. Namely, the transmittance of beam in the image display element may be lowered at the central portion thereof and enhanced at the marginal portion. It is possible in this manner to preliminarily correct the phenomenon that the reading beam is weakened at the marginal region as compared with the central region. Alternatively, a beam intensity modulating element having a higher absorption coefficient at the central region and a lower absorption coefficient at the marginal region may be disposed in front of the reading device 19 so as to obtain the same effect as mentioned above.

Figure 4:
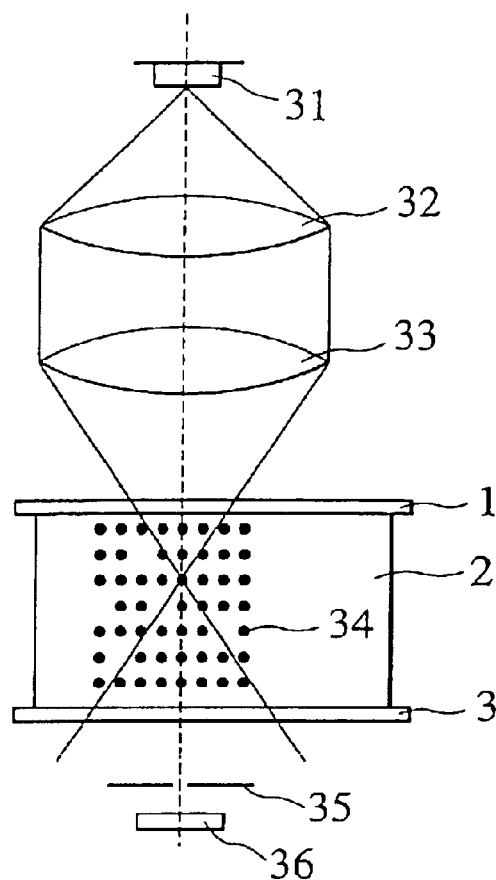
FIG. 4 is a schematic diagram showing an example of an optical recording apparatus for carrying out multi-layer recording of information on the optical recording medium according to the present invention.

Next, the method of recording information in a plurality layers of the recording medium and the method of reading information therefrom in the multi-layer optical recording medium according to one embodiment of the present invention will be explained with reference to FIG. 4.

The beam emitted from a semiconductor laser 31 is turned into a parallel beam by a collimator lens 32, and then, converged in the recording layer by using an objective lens 33. By increasing the inrush current to the semiconductor laser 31 for a suitable period of time on the occasion of irradiating laser beam, the information can be recorded as a change in optical constant at only the vicinity of focal point.

By locating the position of focal point at a desired portion within the medium, the information can be recorded as the region 34 where the optical constant is altered, which can be distinguished from the region where the optical constant is not altered.

Figure 5:
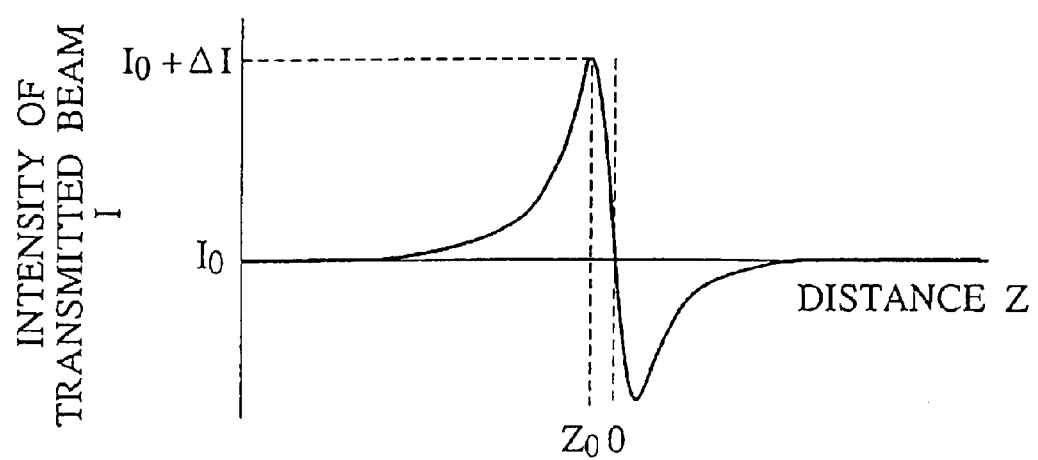
FIG. 5 is an explanatory diagram for explaining data reproduction when information is recorded in multi-layers in the optical recording medium according to the present invention.

The information thus recorded can be read by a process wherein an iris 35 is disposed on the axis of beam and the intensity of beam that has passed through the iris 35 is measured by a beam detector 36. Namely, the reading beam is irradiated so as to enable the axis of reading beam to pass through the region where the optical constant is altered, and the focal point is scanned in the depth-wise of the recording layer. As a result, the intensity I of transmitted beam to be observed can be expressed as a function of the position Z in the direction of depth (herein, the center of the region where the optical constant was altered is defined as Z=0) as shown in FIG. 5. This reason for this can be attributed to the fact that the refractive index of the medium is caused to alter in the vicinity of the focal point of the recording beam, thereby generating the lens effect. Even if the region where the optical constant is not altered is scanned, the intensity of transmitted beam would not be changed. Therefore, by determining if there is a change in intensity of the transmitted beam, it become possible to determine the region where the optical constant is altered. Therefore, if the region to be recorded has been determined in advance, it is possible to read the recorded information by knowing the fluctuation of intensity of transmitted beam in the vicinity of that predetermined region.

However, in order to prevent the optical characteristics from being newly altered on the occasion of reading information, it is desired to confine the intensity of reading beam to about ½ to ¹⁄₁₀₀ of the recording beam by regulating, for example, the inrush current.

Alternatively, as a more simple reading method, the recorded data on the recorded position may be read by detecting the intensity of the transmitted beam in the vicinity of the recorded position. Namely, the recorded information can be read by detecting the intensity of the transmitted beam of the position which is displaced in depth-wise by a distance Z0 (shown in FIG. 5) from the data-recorded position. When the focal point of reading beam is existed at the position which is displaced in depth-wise by the distance Z0 from the region where the information is not recorded, the intensity of the transmitted beam would indicate a value I0, whereas when the focal point of reading beam is existed at the position which is displaced in depth-wise by the distance Z0 from the region where the information is recorded, the intensity of the transmitted beam would be I0+ΔI, so that, by detecting this intensity of the transmitted beam, the recorded information existing at the position which is displaced by the distance Z0 from the focal point of the reading beam can be read. It is also possible to read the information by detecting the intensity of the transmitted beam at the position which is displaced by the distance Z0 in the direction of the axis of beam from the region from which the signal is desired to be read.

In the case where the film thickness is sufficiently large or where the glass plate is disposed on the objective lens side of the recording layer, a lens which is long in operating distance such as CF IC LCD Plan CR (trade name, NIKON Co., Ltd.; magnification: 100 times) can be preferably employed as an objective lens. Further, in the case where the substrate is disposed at the top and bottom surfaces of the recording layer, the thickness of the substrate to be disposed on the objective lens side should preferably be 0.5 mm or less. Alternatively, the substrate may not be disposed on the objective lens side of the recording layer. In that case, the recording layer may be housed inside a diskette in order to prevent the recording layer from being scratched.

The method of recording information to the optical recording medium according to one embodiment of the present invention as well as the method of reading the information therefrom are not limited to the aforementioned examples, but may be variously modified. For example, reading information may be performed in the same manner as in the case of a confocal microscope. Alternatively, a reflective face may be provided on the side of optical recording medium which is opposite to where the objective lens is disposed, thereby making it possible to read information by using a reflected beam.

The optical recording medium according to the present invention is not limited to the aforementioned embodiments, but may be varied within the spirit of the invention. For example, if the recording layer of the optical recording medium has a sufficient strength, it may be employed singly without supplementing it with a supporting plate.

EXAMPLES

Example 1

According to the following prescription, the components below were dissolved in tetrahydrofuran to prepare a tetrahydrofuran solution.

[Components]
Electric Charge Generation and Transport Polymer:
20.0% by weight of polyvinyl carbazole
Electric Charge Generation Material:
1.0% by weight of trinitro fluorenone
Non-Linear Optical Material:
79.0% by weight of a compound represented by the following formula (2):

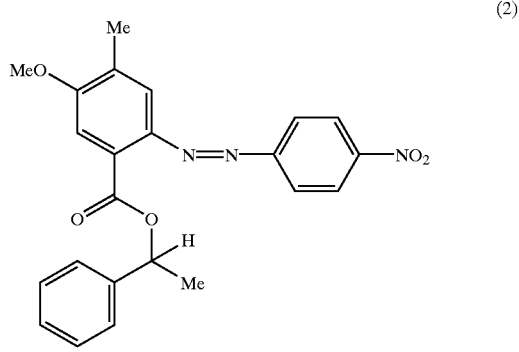

(2)

The obtained solution was heated at a temperature of 30 degrees centigrade for 2 hours in a nitrogen gas, followed by further heating at a temperature of 90 degrees centigrade for 24 hours, thereby the solvent was removed to obtain a solidified medium sample for use in optical recording.

Preparing a pair of glass substrates (40×80×1 mm), a pattern of concentric transparent electrodes having a width of 1 mm was formed at intervals of 0.1 mm on one surface of one of said pair of substrates, and the other substrate was formed with a transparent electrode covering the whole of one surface thereof. The solidified medium sample described above was put between said pair of substrates and was heated under a pressure applied with an intervening spacer, so that an element having the medium of a 200 microns' thickness was prepared. At that time, each of the electrodes was disposed so as to contact with the medium and was provided with a conductive portion which was extended to the outside of the opposing substrates so that a voltage could be supplied to the electrodes from the outside.

Next, with the prepared elements, the medium samples were subjected to evaluation of the performance as the optical recording medium, as follows.

First, the function as the hologram memory was examined. In order to produce an interference pattern in the medium placed between the electrodes, a He—Ne laser beam (633 nm) was split in two beams, a signal light and a reference light. They were then irradiated so as to cross each other in the medium sample, thereby an interference pattern due to the laser light was formed in the medium sample. For the signal light, a light that had transmitted through a transmission type image display device (pager) that was constituted from a liquid crystal display device was used and was entered with a spot diameter of 0.8 mm and an incidence angle of 30 degrees. At that time, a voltage of 600 V was applied to the electrodes which sandwiched the position where the interference pattern was to be generated, and an irradiation time for recording was set at 10 seconds. In addition, by repeating the recording while moving the spot of the crossing beams by 0.5 mm, the spot recording was performed similarly between the whole of the concentric electrodes and the opposite electrode. At that time, the application of voltage was controlled so as not to apply to the electrodes other than those therebetween the recording was performed.

The signal light was then cut and the reference light alone was entered from the same direction with the same wavelength as those during the recording. In this state, if the medium was in a recorded state, the reference light had to be diffracted in the medium. Accordingly, a light power meter for measuring a beam intensity was disposed facing to the direction in which the diffracted reference light was to come to it, and an intensity of the diffracted light (reproduction light) was measured. A ratio of the intensity of the measured diffracted light relative to that of the reference light was calculated as a diffraction efficiency. As a result, the diffraction efficiency immediately after the recording was 1.0% and that after a half year was 0.9%.

In place of the light power meter disposed was a CCD light detector for taking the reproduced image. Similarly to the above, the reproduction was carried out by the irradiation of the reference light. As a result, a reproduced image can be clearly observed. This reproduced image did not change even after a half year, that is, the optical quality of the medium was maintained as well.

Moreover, with the aforementioned element before the recording, multiple recording of an output from a liquid crystal type spatial modulator was performed in accordance with angle multiplexing recording, to record 100 images which were shifted by little and little in the up-and-down direction. When the reproduction light was detected with the CCD light detector, all the images could be reproduced. The multiply recorded images could be reproduced even after a half year.

Comparative Example 1

The procedures of Example 1 were repeated, excepting that the non-linear optical material used was changed to N-[[(diethylamino) phenyl]methylene]-2-methyl-4-nitrobenzenamine (DBMNA), to obtain a medium sample. An element was produced from the obtained medium sample and the optical recording and reproducing were similarly performed. The diffraction efficiency immediate after the recording was only 0.5%, but the reproduction after a half year was impossible. As to the optical quality of the medium, although the image could be reproduced immediate after the recording, it deteriorated only after a week.

Next, multiple recording of an output from a liquid crystal type spatial modulator was performed in accordance with the angle multiplexing recording, to record a plurality of images which were shifted by little and little in the up-and-down direction. As a result, it was found that, if more than five images were recorded, the images turned not reproducible in the recording order from the first recorded one. Moreover, all the images could not be reproduced after a half-year.

Example 2

According to the following prescription, the components below were dissolved in tetrahydrofuran to prepare a tetrahydrofuran solution.

[Components]
Matrix:
30.0% by weight of polystyrene
Electric Charge Transport Material:
30.0% by weight of triphenyl amine
Electric Charge Generation Material:
0.5% by weight of fullerene $C_{70}$
Electric Charge Trap:
9.5% by weight of 2,5-bis(4-diethylaminophenyl)-1,3,4-oxadiazole
Non-Linear Optical Material:
30.0% by weight of a compound represented by the following formula (3):

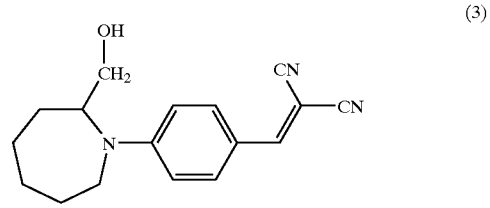

The obtained solution was heated at a temperature of 30 degrees centigrade for 2 hours in a nitrogen gas, followed by further heating at a temperature of 50 degrees centigrade for 24 hours, thereby the solvent was removed to obtain a solidified medium sample for use in optical recording.

Moreover, a pair of circular glass substrates (diameter: 50 mm, thickness: 1 mm) were prepared, and the aforementioned solidified medium sample was sandwiched between the substrates and heated under a pressure applied through an intervening spacer. As a result, an element having the medium of a 400 microns' film thickness was produced.

Next, with a lens having an NA of 0.75, an Ar+ laser beam (514.5 nm) is focused to record marks having a size of 2 microns at intervals of 1 micron on the produced element. Moreover, the recording was repeated ten times, while changing the distance between the lens and the element by 5 microns for each time, to produce 10 layers of record. A profile of a light (wavelength: 670 nm) that transmitted through the recorded element and a light reflected from the recorded marks were detected, and thereby the record was reproduced. As a result, the marks were clearly reproduced over all the layers, and the reproduction was possible even after 5 years.

Comparative Example 2

The procedures of Example 2 were repeated, excepting that the non-linear optical material used was a compound represented by the following formula (4), to obtain a medium sample. An element was produced from the obtained medium sample and the recording of marks was similarly performed. Immediately after the recording, all the marks can be reproduced, but the reproduction after two months was impossible.

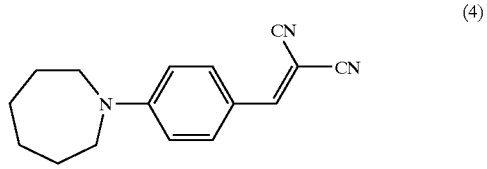

(4)

Examples 3–8, Comparative Examples 3–6

According to the following prescription, the materials below were dissolved in toluene to prepare a toluene solution, for each of Examples 3–8 and Comparative Examples 3–6.

[Materials]
Non-Linear Optical Material:
30.0% by weight of a compound represented by the aforementioned formula (1)
(R1, R2 and R3 in the formula (1) are described in Table 1)
Electric Charge Transport Material:
30.0% by weight N,N-diphenyl-N,N-di(m-tril)-p-benzidine
Electric Charge Generation Material:
0.5% by weight of fullerrene $C_{70}$
Charge Trap:
9.5% by weight of 2,5-bis((4-diethylamino)phenyl)-1,3,4-oxadiazole
Matrix:
30.0% by weight of polystyrene In each case, the obtained solution was heated at a temperature of 30 degrees centigrade for 2 hours in a nitrogen gas, followed by heating further at a temperature of 90 degrees centigrade for 24 hours, thereby the solvent was removed to obtain a solidified medium sample for use in optical recording.

Moreover, a pair of circular glass substrates (diameter: 50 mm, thickness: 1 mm) with transparent electrode on one surface of each thereof was prepared. Here, the transparent electrode of one of the pair of glass substrates was concentrically patterned with a width of 1 mm at intervals of 0.1 mm on one surface thereof, and that of the other substrate was formed over the whole of one surface thereof. The solidified medium sample described above was interposed between the substrates and was heated under a pressure applied through an intervening spacer, so that an element having the medium of a 400 microns' thickness was prepared. At that time, each of the electrodes was disposed so as to contact with the medium and was provided with a conductive portion which was extended to the outside of the opposing substrates so that a voltage could be supplied to the electrodes from the outside.

Next, the recording operation shown in Example 1 was repeated, excepting that Ar+ laser beam (514.5 nm) was used, to perform the recording with the spot irradiation and the multiplex recording of 100 layers. Then the reproduction light was measured to calculate the diffraction efficiency therefrom, and the images recorded according to the multiplex recording were reproduced. Moreover, with a sample medium that one year has passed after the same recording, the diffraction efficiency was similarly calculated and the images recorded according to the multiplex recording were reproduced, thereby the maintenance ratios of the diffraction efficiency and of the multiplicity were calculated, respectively. Here, it is noted that the maintenance ratio of the diffraction efficiency is a ratio of the diffraction efficiency obtained immediately after the recording to that obtained after a predetermined time, and that the maintenance ratio of the multiplicity is a ratio of the number of layers capable of reproducing immediately after the recording to that after a predetermined time.

Moreover, from the spot recording with a diameter of 5 microns, optical quality that was an indicator expressing the change with time of the homogeneity of the film was obtained as follows. First, transmittance was measured immediately after the spot recording and after one year had passed. Next, assuming that the distribution of the transmittance had a Gaussian distribution, the dispersion, represented by σ, was calculated. Then, by normalizing the dispersion, σ', obtained after one year with respect to that (σ=1) immediately after the recording, the optical quality was determined as "A" when the value of normalized value, σ', was in the range of from 1 to 1.5, as "B" in the range of 1.5 to 2, as "C" in the range of 2 to 3, and as "D" in the range of 3 or more.

The results of the above are shown in Table 1.

TABLE 1

| | R1— | R2— | R3— | Maintenance Ratio of Diffraction Efficiency | Maintenance Ratio of Multiplicity | Optical Quality |
|---|---|---|---|---|---|---|
| Example | | | | | | |
| 3 | (imidazole) | (phenyl) | Et— | 1.0 | 1.0 | A |
| 4 | (benzimidazole) | (pyridyl) | H— | 1.0 | 1.0 | A |

TABLE 1-continued

| | R1— | R2— | R3— | Maintenance Ratio of Diffraction Efficiency | Maintenance Ratio of Multiplicity | Optical Quality |
|---|---|---|---|---|---|---|
| 5 | 2-methylimidazole (N-H, 2-yl) | Et— | Pr— | 0.9 | 1.0 | B |
| 6 | 2-methylnaphthyl | iso-Bu— | H— | 0.9 | 0.95 | B |
| 7 | 2-methylthiazole | phenyl | H— | 1.0 | 1.0 | A |
| 8 | imidazol-2-yl-(CH$_2$)$_3$— | iso-Bu— | H— | 0.9 | 0.95 | B |
| Comparative Example | | | | | | |
| 3 | MeO— | Me— | H— | 0 | 0 | D |
| 4 | tolyl (methylphenyl) | H— | H— | 0.03 | 0 | C |
| 5 | 2-methylimidazole | Me— | Me— | 0.05 | 0 | D |
| 6 | 2-methylnaphthyl | H— | H— | 0.08 | 0 | D |

Example 9

According to the following prescription, the materials shown below were dissolved in anisole to prepare an anisole solution.

Non-Linear Optical Material:

30.0% by weight of a compound represented by the following formula (5)

Electric Charge Transport Material:

30.0% by weight of 3,3-bis-(p-methoxyphenyl)-acrolein-1'-amino-1',2',3',4'-tetrahydroquinolin hydrazone Electric Charge Generation Material:

0.5% by weight of fullerrene C$_{70}$

Electric Charge Trap:

9.5% by weight of 2,5-bis (4-(diethylamino)phenyl)-1,3,4-oxadiazole

Matrix:

30.0% by weight of polystyrene

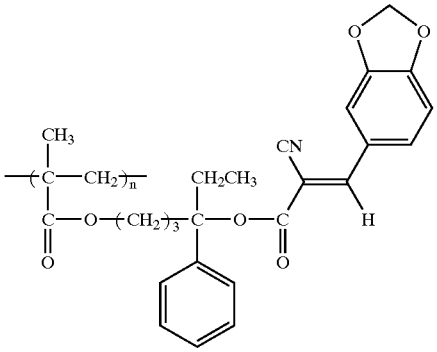

(5)

The preparation procedures of Examples 3–8 were repeated to obtain a medium samples for use in optical recording and prepare an element therewith. Then, the recording due to the spot irradiation and the multiplex recording of 100 layers were performed similarly to Example 1. The reproduced light was measured to calculate the diffraction efficiency, and the multiplex recording images were also reproduced. Moreover, with a medium sample that was stored one year after the recording, the diffraction efficiency was calculated and the multiplex recording images were reproduced, similarly, to calculate the maintenance ratios of the diffraction efficiency and of the multiplicity. Then the optical quality was similarly determined from the spot recording with a diameter of 5 microns.

As a result, the maintenance ratio of the diffraction efficiency was 0.9 and that of the multiplicity was 0.9, and the optical quality was determined as A.

As described above, in the optical recording medium in which an asymmetric compound having a cyclic group is used as the non-linear optical material according to the present invention, it is obvious that the recorded information is suppressed from deteriorating and the record can be stored for a longer period, and the molecular orientation is thus considered as being suppressed from relaxing, According to the present invention, the optical quality of the information recorded on the optical recording medium can be suppressed from deteriorating, that is, the recorded information can be stored for a longer period. Accordingly, an optical recording medium that is high in the sensitivity and diffraction efficiency, and capable of storing the record for a longer period with stability can be provided.

It must be understood that the invention is in no way limited to the above embodiments and that many changes may be brought about therein without departing from the scope of the invention as defined by the appended claims.

What is claimed is:

1. An optical recording medium comprising a recording layer containing:
   a charge generation material generating an electron and a hole by light irradiation;
   a charge transport material transporting one of the electron and the hole;
   a charge trap which traps the transported one of the electron and the hole to separate the electron and the hole; and
   a non-linear optical material which changes optical property of the recording layer in accordance with electric field formed by the electron and the hole being separated from each other, the non-linear optical material comprising a chiral compound having an asymmetrical carbon atom and a cyclic group wherein the asymmetric carbon atom is a constituent member of the cyclic group of the non-linear optical material.

2. The optical recording medium of claim 1, wherein the recording layer contains the charge generation material at a content of 0.01% to 60% by weight, the charge transport material at a content of 1% to 80% by weight, the charge trap at a content of 0.01% to 50% by weight, and the non-linear optical material at a content of 5% to 90% by weight.

3. The optical recording medium of claim 1, wherein the cyclic group has a monocyclic structure or a fused-ring structure.

4. The optical recording medium of claim 1, wherein the optical property is optical density, refractive index, fluorescence quantum yield, or reflectivity.

5. The optical recording medium of claim 1, wherein the charge generation material is a charge transfer complex comprising an electron donating component and an electron accepting component.

6. The optical recording medium of claim 1, wherein the non-linear optical material is a component which is carried on a polymer.

7. The optical recording medium of claim 1, wherein the cyclic group is a group which is selected from the group consisting of aromatic hydrocarbon groups, heterocyclic groups and alicyclic hydrocarbon groups.

8. The optical recording medium of claim 1, wherein the non-linear optical material is a compound represented by the following chemical formula (3):

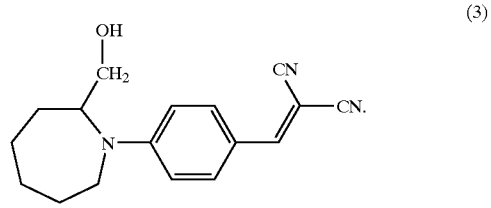

(3)

9. An optical recording medium comprising a recording layer containing:
   a charge generation material generating an electron and a hole by light irradiation;
   a charge transport material transporting one of the electron and the hole;
   a charge trap which traps the transported one of the electron and the hole to separate the electron and the hole; and
   a non-linear optical material represented by the chemical formula (1):

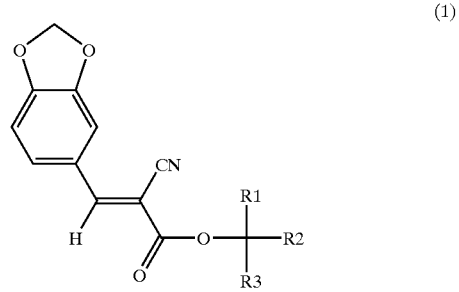

(1)

(where, in the chemical formula (1), R1 is a cyclic group, R2 and R3 are respectively an element which is selected from the group consisting of aromatic hydrocarbon groups, heterocyclic groups, aliphatic hydrocarbon groups, alicyclic hydrocarbon groups and hydrogen atom, and R1, R2 and R3 are different from one another).

10. The optical recording medium of claim 9, wherein the cyclic group is a group which is selected from the group consisting of aromatic hydrocarbon groups, heterocyclic groups and alicyclic hydrocarbon groups.

11. The optical recording medium of claim 9, wherein the recording layer contains the charge generation material at a content of 0.01 t to 60% by weight, the charge transport material at a content of 1% to 80% by weight, the charge trap at a content of 0.01% to 50% by weight, and the non-linear optical material at a content of 5% to 90% by weight.

12. The optical recording medium of claim 9, wherein the cyclic group has a monocyclic structure or a fused-ring structure.

13. The optical recording medium of claim 9, wherein the optical property is optical density, refractive index, fluorescence quantum yield, or reflectivity.

14. The optical recording medium of claim 9, wherein the charge generation material is a charge transfer complex comprising an electron donating component and an electron accepting component.

15. The optical recording medium of claim 9, wherein the non-linear optical material is a component which is carried on a polymer.

16. An optical recording medium comprising a recording layer containing:
a charge generation material generating an electron and a hole by light irradiation;
a charge transport material transporting one of the electron and the hole;
a charge trap which traps the transported one of the electron and the hole to separate the electron and the hole; and
a non-linear optical material which changes an optical property of the recording layer in accordance with electric field formed by the electron and the hole being separated from one another, the non-linear optical material being a chiral and cyclic-group-containing constituent having: an inversion symmetric π-electron system; at least one of an electron donating group and an election accepting group which are bonded to the inversion symmetric π-electron system; and an asymmetrical carbon atom, wherein the asymmetric carbon atom is a constituent member of a cyclic group of the non-linear optical material.

17. The optical recording medium of claim 16, wherein the electron donating group is selected from the group consisting of nitro group, cyano group, sulfonic acid group, aldehyde group, carboxyl group and alkoxycarbonyl group, and the electron accepting group is selected from the group consisting of amino group, mono- or di-alkylamino group, hydroxy group, alkoxy group, alkyl group, halogen and aryl group.

18. The optical recording medium of claim 16, wherein the inversion symmetric π-electron system has a ring structure.

19. An optical recording apparatus comprising:
an optical recording medium comprising a recording layer containing a charge generation material generating an electron and a hole by light irradiation, a charge transport material transporting one of the electron and the hole, a charge trap which traps the transported one of the electron and the hole to separate the electron and the hole, and a non-linear optical material which changes an optical property of the recording layer in accordance with electric field formed by the electron and the hole being separated from one another, the non-linear optical material being a chiral compound having an asymmetrical carbon atom and a cyclic group wherein the asymmetric carbon atom is a constituent member of a cyclic group of the non-linear optical material;
a light source emitting a light beam effective to the charge generation material;
a beam splitter separating the light beam into a first light beam and a second light beam;
a first optical device which is configured to provide information to be recorded, to the first light beam; and
a second optical device which is configured to intersect the first light beam provided with the information and the second light beam within the recording layer, the intersected first and second light beams making an interference pattern to record the information as a change of the optical property of the recording layer.

20. An optical recording apparatus comprising:
an optical recording medium comprising a recording layer containing a charge generation material generating an electron and a hole by light irradiation,
a charge transport material transporting one of the electron and the hole, a charge trap which traps the transported one of the electron and the hole to separate the electron and the hole, and a non-linear optical material represented by a chemical formula (1):

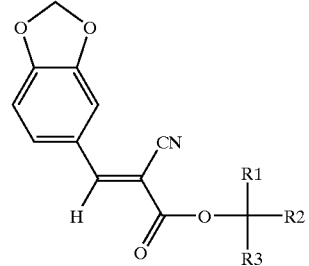

(1)

(where, in the chemical formula (1), R1 is a cyclic group, R2 and R3 are respectively a group which is selected from the group consisting of aromatic hydrocarbon groups, heterocyclic groups, aliphatic hydrocarbon groups, alicyclic hydrocarbon groups and hydrogen atom, and R1, R2 and R3 are different from one another);
a light source emitting a light beam effective to the charge generation material;
a beam splitter separating the light beam into a first light beam and a second light beam;
a first optical device which is configured to provide information to be recorded, to the first light beam; and
a second optical device which is configured to intersect the first light beam provided with the information and the second light beam within the recording layer, the intersected first and second light beams making an interference pattern to record the information as a change of an optical property of the recording layer.

* * * * *